(12) United States Patent
Reveles et al.

(10) Patent No.: US 10,738,498 B2
(45) Date of Patent: Aug. 11, 2020

(54) DEPLOYABLE MAST STRUCTURE

(71) Applicant: Oxford Space Systems Limited, Harwell, Didcot, Oxfordshire (GB)

(72) Inventors: Juan Reveles, Longworth (GB); Vincent Fraux, Didcot (GB); Yoshiro Ogi, Didcot (GB)

(73) Assignee: OXFORD SPACE SYSTEMS LTD, Harwell Oxford Didcot (GB)

(*) Notice: Subject to any disclaimer, the term of this patent is extended or adjusted under 35 U.S.C. 154(b) by 0 days.

(21) Appl. No.: 16/348,329

(22) PCT Filed: Nov. 8, 2017

(86) PCT No.: PCT/GB2017/053359
§ 371 (c)(1),
(2) Date: May 8, 2019

(87) PCT Pub. No.: WO2018/087538
PCT Pub. Date: May 17, 2018

(65) Prior Publication Data
US 2019/0277051 A1 Sep. 12, 2019

(30) Foreign Application Priority Data
Nov. 8, 2016 (GB) .................................. 1618846.8

(51) Int. Cl.
*E04H 12/18* (2006.01)
*E04H 12/02* (2006.01)
(Continued)

(52) U.S. Cl.
CPC ........... *E04H 12/187* (2013.01); *B29C 70/30* (2013.01); *B29C 70/446* (2013.01);
(Continued)

(58) Field of Classification Search
CPC ....... E04H 12/187; E04H 12/02; E04H 12/34; B64G 1/222; H01Q 1/288
See application file for complete search history.

(56) References Cited

U.S. PATENT DOCUMENTS 3,848,821 A 11/1974 Scheel
4,557,097 A * 12/1985 Mikulas, Jr. .......... E04H 12/185
16/242
(Continued)

FOREIGN PATENT DOCUMENTS

DE 10318885 A1 11/2004
EP 1077506 A1 2/2001
(Continued)

OTHER PUBLICATIONS

European Patent Office, International Search Report and Written Opinion, dated Mar. 1, 2018.

*Primary Examiner* — Paola Agudelo
(74) *Attorney, Agent, or Firm* — Umberg Zipser LLP

(57) ABSTRACT

A deployable mast structure (100) is disclosed, comprising a body configured to adopt a tubular shape when the mast structure is in a deployed configuration, and a plurality of openings (102) formed in a wall of the body so as to define a plurality of integral tape-spring hinges (103) in the wall of the body, the plurality of openings being configured so as to permit the body to collapse along its longitudinal axis into a stowed configuration when the tape-spring hinges are buckled. In the stowed configuration, the integral tape-spring hinges are configured to exert a force which urges the structure towards the deployed configuration. Since the mast structure collapses along its longitudinal axis, the structure only occupies a small volume in the stowed configuration. A method of fabricating the deployable mast structure from a layered composite material is also disclosed.

19 Claims, 4 Drawing Sheets

(51) Int. Cl.
*B29C 70/30* (2006.01)
*E04H 12/34* (2006.01)
*B29C 70/54* (2006.01)
*H01Q 1/28* (2006.01)
*B29C 70/44* (2006.01)
*B64G 1/22* (2006.01)
*B29K 63/00* (2006.01)
*B29K 307/04* (2006.01)
*B29L 31/34* (2006.01)
*H01Q 1/12* (2006.01)

(52) U.S. Cl.
CPC ............ *B29C 70/545* (2013.01); *B64G 1/222* (2013.01); *E04H 12/02* (2013.01); *E04H 12/34* (2013.01); *H01Q 1/288* (2013.01); *B29K 2063/00* (2013.01); *B29K 2307/04* (2013.01); *B29L 2031/3456* (2013.01); *H01Q 1/1235* (2013.01)

(56) References Cited

U.S. PATENT DOCUMENTS

| | | | | |
|---|---|---|---|---|
| 4,578,919 A | * | 4/1986 | Amadon | B64G 9/00 52/108 |
| 5,085,018 A | * | 2/1992 | Kitamura | E04H 12/187 52/108 |
| 5,163,262 A | * | 11/1992 | Adams | B64G 9/00 52/111 |
| 6,217,975 B1 | * | 4/2001 | Daton-Lovett | B65G 15/08 428/105 |
| 6,321,503 B1 | * | 11/2001 | Warren | B64G 1/222 16/225 |
| 6,374,565 B1 | | 4/2002 | Warren | |
| 6,910,304 B2 | * | 6/2005 | Warren | B64G 1/222 52/108 |
| 6,970,143 B2 | * | 11/2005 | Allen | H01Q 15/20 343/880 |
| 7,354,033 B1 | * | 4/2008 | Murphey | B64G 1/222 267/151 |
| 8,074,324 B2 | * | 12/2011 | Warren | B64G 1/222 16/225 |
| 9,714,519 B2 | * | 7/2017 | Slade | B64G 1/222 |
| 2001/0010012 A1 | * | 7/2001 | Edwin | A61F 2/07 623/1.13 |
| 2003/0019180 A1 | * | 1/2003 | Warren | B64G 1/222 52/646 |
| 2003/0182879 A1 | * | 10/2003 | Warren | B64G 1/222 52/108 |
| 2011/0061332 A1 | | 3/2011 | Hettick | |

FOREIGN PATENT DOCUMENTS

| | | |
|---|---|---|
| EP | 2272761 A1 | 1/2011 |
| EP | 2783989 A2 | 10/2014 |
| EP | 2993131 A1 | 3/2016 |
| WO | 1991008949 A2 | 6/1991 |

* cited by examiner

DEPLOYABLE MAST STRUCTURE

TECHNICAL FIELD

The present invention relates to deployable mast structures. More particularly, the present invention relates to deployable mast structures which comprise a tubular body and a plurality of tape-spring hinges.

BACKGROUND

Deployable structures are used in various applications when the physical size of an apparatus needs to be temporarily reduced, for example for storage or transportation purposes. One such field in which deployable structures are widely used is that of space-based applications, particularly satellites and other space vehicles which are launched into space in the rocket fairing. Since there is only limited space available in the fairing, deployable structures are used which can be stowed into a small volume prior to launch.

Deployable masts have been developed in which long rigid mast sections are joined by tape-spring hinges. Such masts can be stowed by buckling the tape-spring hinges so that the rigid mast sections are folded back to lie alongside one another. The tape-spring hinges store elastic strain energy that causes the structure to automatically deploy once a restraining force is removed. Whilst this folding arrangement reduces the overall length of the structure in comparison to the length of the fully-deployed mast, the total reduction in size is limited by the length of the rigid mast sections. For example, if the mast comprises three rigid sections of equal length connected by tape-spring hinges, the total length of the collapsed structure will be roughly one-third that of the fully-extended structure. It would therefore be desirable to provide a more compact form of deployable mast structure.

The invention is made in this context.

SUMMARY OF THE INVENTION

According to a first aspect of the present invention, there is provided a deployable mast structure comprising a body configured to adopt a tubular shape when the mast structure is in a deployed configuration, and a plurality of openings formed in a wall of the body so as to define a plurality of integral tape-spring hinges in the wall of the body, the plurality of openings being configured so as to permit the body to collapse along its longitudinal axis into a stowed configuration when the tape-spring hinges are buckled, wherein in the stowed configuration, the integral tape-spring hinges are configured to exert a force which urges the structure towards the deployed configuration.

In some embodiments according to the first aspect, the plurality of openings are arranged into a plurality of groups spaced apart along the longitudinal axis of the body, such that each group of openings defines a hinge section comprising a plurality of tape-spring hinges arranged around the longitudinal axis, adjacent hinge sections being connected by a section of the wall in which no tape-spring hinges are formed. In such embodiments, the deployable mast structure may further comprise a plurality of reinforcing members each configured to reinforce one of the sections of the wall in which no tape-spring hinges are formed. For example, in some embodiment according to the first aspect the wall of the body may be formed from a layered composite material and each of the plurality of reinforcing members may comprise one or more additional layers of the composite material, such that the sections of the wall in which no tape-spring hinges are formed have a higher stiffness than the hinge sections.

In some embodiments according to the first aspect, a length of each of the plurality of openings within a section of the body is selected such that the tape-spring hinges within said section can be folded inwardly towards a centre of the body when the structure is in the stowed configuration.

In some embodiments according to the first aspect, the plurality of openings are configured such that the tape-spring hinges defined by the openings are narrower at their ends.

In some embodiments according to the first aspect, the body is tapered in width along the longitudinal axis. An angle of the taper may be selected to permit a section of the wall at one end of one of the tape-spring hinges to be stored inside a section of the wall at the opposite end of said one of the tape-spring hinges, when the mast structure is in the stowed configuration.

In some embodiments according to the first aspect, the deployable mast structure further comprises a control mechanism configured to control a speed at which the mast structure deploys from the stowed configuration once a restraining force is removed, the control mechanism being configured to exert a braking force which partly counteracts the force exerted by the tape-spring hinges. The control mechanism may comprise an eddy current damper connected to an end of the mast structure by at least one fibre, the eddy current damper being configured to generate a damping force that is proportional to the speed of deployment.

In some embodiments according to the first aspect, the body is configured to have a circular cross-section in a plane perpendicular to the longitudinal axis, when in the deployed configuration.

In some embodiments according to the first aspect, the tubular structure is configured such that a cross-section perpendicular to the longitudinal axis includes one or more straight-edge segments, and further includes a plurality of curved-edge segments in which the tape-spring hinges are formed.

In some embodiments according to the first aspect, the deployable mast structure is included in a deployable antenna assembly comprising a primary reflector, the primary reflector being disposed at one end of the deployable mast structure, and a secondary reflector, the secondary reflector being disposed at an opposite end of the deployable mast structure to the primary reflector.

In some embodiments according to the first aspect, the deployable mast structure is included in a deployable telescope assembly comprising a sensor disposed at one end of the deployable mast structure, and one or more optical elements disposed along the deployable mast structure.

In some embodiments according to the first aspect, the deployable mast structure can be used as part of a separation mechanism for detaching a first body (e.g. a spacecraft) from a second body (e.g. a payload), wherein the deployable mast structure is configured to urge the first body away from the second body upon the release of a restraining force holding the deployable mast structure in the stowed configuration.

In some embodiments according to the first aspect, a system comprises the deployable mast structure and a hold down and release mechanism configured to apply a restraining force to hold the structure in the stowed configuration.

According to a second aspect of the present invention, there is provided a method of fabricating a deployable mast structure according to the first aspect, the method comprising steps of: forming the plurality of openings in one or more composite plies; laying the one or more composite plies around a curved mandrel shaped to define the wall of the body; curing the one or more composite plies to form the wall of the body; and removing the mandrel.

In some embodiments according to the second aspect, the method further comprises a step of laying one or more additional plies around the mandrel at intervals along the longitudinal axis of the body, so as to form reinforcing members configured to reinforce a section of the wall in which no tape-spring hinges are formed.

BRIEF DESCRIPTION OF THE DRAWINGS

Embodiments of the present invention will now be described, by way of example only, with reference to the accompanying drawings, in which.

DETAILED DESCRIPTION

Figure 1:
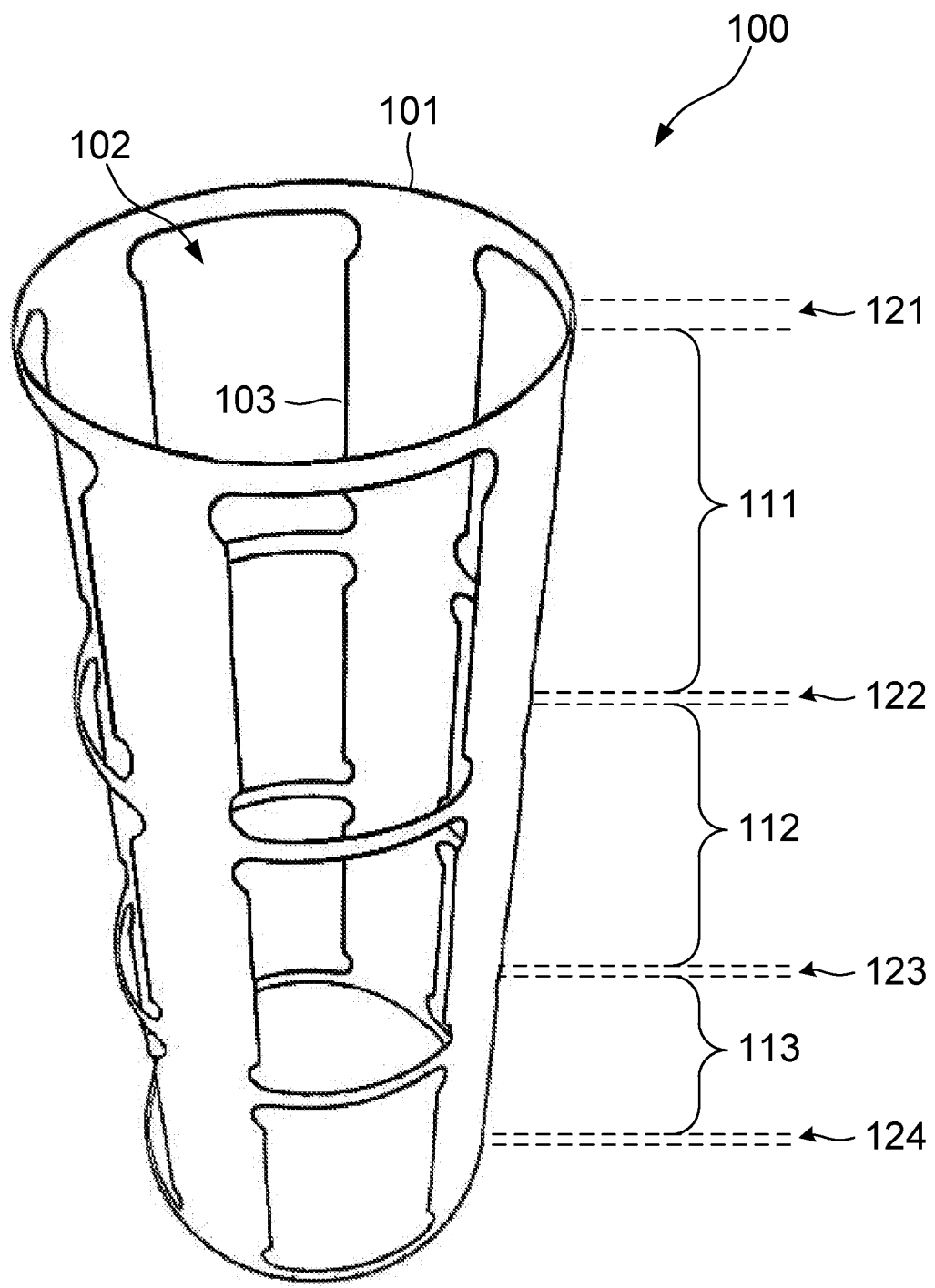
FIG. 1 illustrates a perspective view of a deployable mast structure according to an embodiment of the present invention.

In the following detailed description, only certain exemplary embodiments of the present invention have been shown and described, simply by way of illustration. As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
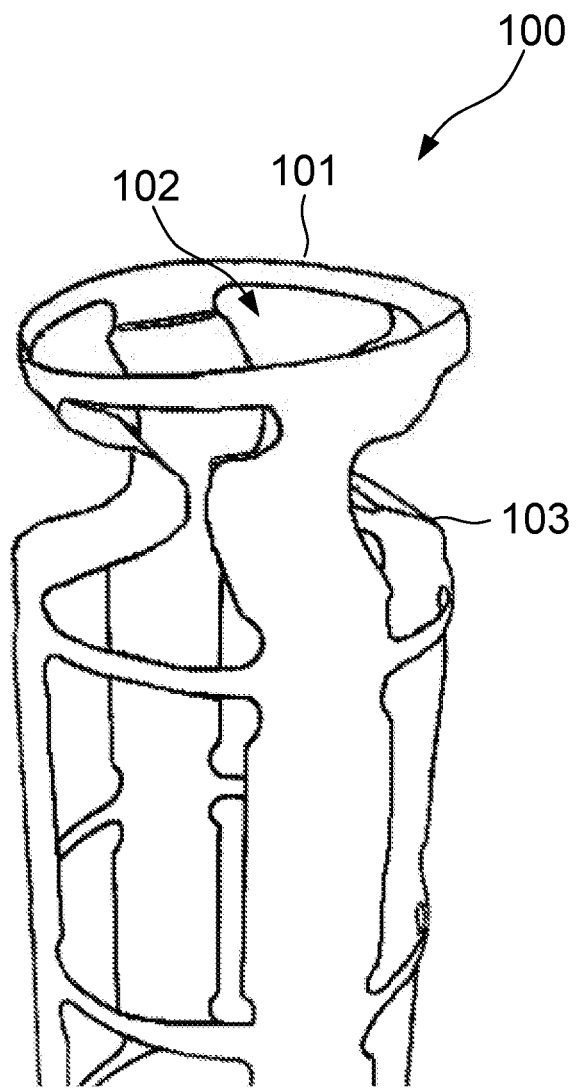
FIG. 2 illustrates a perspective view of the deployable mast structure of FIG. 1 with the top tape-spring section in the collapsed configuration.

Referring now to FIGS. 1 and 2, a deployable mast structure 100 is illustrated according to an embodiment of the present invention. In FIG. 1, the mast structure 100 is illustrated in a deployed configuration. The mast structure 100 is capable of being collapsed into a stowed configuration in which the structure 100 occupies a smaller volume than in the deployed configuration, and can subsequently be deployed by extending the structure 100 into the configuration shown in FIG. 1. The stowed configuration can also be referred to as a collapsed configuration, and the deployed configuration can be referred to as an extended configuration.

The deployable mast structure 100 of the present embodiment comprises a thin-walled body 101. The body 101 is configured to adopt a tubular shape when the mast structure 100 is in the deployed configuration, as illustrated in FIG. 1. In the present embodiment, the body 101 is configured to have a circular cross-section in a plane perpendicular to the longitudinal axis, when in the deployed configuration. However, in other embodiments a different cross-sectional shape may be used, for example an elliptical or polygonal cross-section.

The mast structure 100 further comprises a plurality of openings 102 formed in the wall of the body 101. The plurality of openings 102 are configured so as to define a plurality of integral tape-spring hinges 103 in the wall of the body 101. The plurality of openings 102 are configured so as to permit the body 101 to collapse along its longitudinal axis into a collapsed configuration when the tape-spring hinges 102 are buckled. In the collapsed configuration, the integral tape-spring hinges 102 are configured to exert a deployment force which urges the structure 100 towards the deployed configuration.

In the present embodiment the plurality of openings 102 are arranged into groups spaced apart along the longitudinal axis of the body 101, such that each group of openings 102 defines a hinge section 111, 112, 113 comprising a plurality of tape-spring hinges 103 arranged around the longitudinal axis. In the present embodiment each hinge section 111, 112, 113 comprises four openings 102, which together define four tape-spring hinges 103 arranged around the central longitudinal axis. In other embodiments any number of tape-spring hinges may be provided within one hinge section, by forming an appropriate number of openings.

Adjacent groups of openings 102, that is, hinge sections 111, 112, 112 which are adjacent one another along the longitudinal axis, are connected by a section of the wall in which no tape-spring hinges are formed. In the present embodiment these sections are ring-shaped, since the tubular body 101 has a circular cross-section, and are hereinafter referred to as 'ring sections'.

By arranging the openings into groups in this way, a deployable mast structure 100 is formed which comprises alternating hinge sections 111, 112, 113 and ring sections 121, 122, 123, 124. In the present embodiment a three-tier structure is illustrated purely by way of an example, comprising three hinge sections 111, 112, 113 connected at either end to one of the ring sections 121, 122, 123, 124. However, in other embodiments any number of tiers may be provided. For example, in one embodiment a deployable mast structure may only comprise a single hinge section with a ring section at either end.

An example of a mechanism by which the mast structure of FIG. 1 can be collapsed and deployed will now be described with reference to FIG. 2, which illustrates the deployable mast structure 100 with the tape-spring hinges 103 in the top hinge section 111 partially collapsed.

In the present embodiment, the length of the openings 102 within each hinge section 111, 112, 113 is selected such that the tape-spring hinges 103 within each hinge section 111, 112, 113 can be folded inwardly towards the centre of the body 101 without interfering with one another when the structure is in a collapsed configuration, as shown in FIG. 2. For example, in some embodiments the length of the openings 102 can be selected such that when the tape-spring hinges 103 are folded inwardly as shown in FIG. 2, in the fully-collapsed configuration each tape-spring hinge 103 protrudes inwardly towards the central axis of the structure 100 without making contact with any of the other tape-spring hinges in the same hinge section. In other embodiments, the tape-spring hinges within one section may make contact with one another in the stowed configuration, but may be arranged such that the tape-spring hinges do not prevent each other from unfolding as the structure extends. For example, in some embodiments the folded tape-spring hinges may be overlapped with one another near the centre of the structure, in the stowed configuration.

Folding the tape-spring hinges 103 inwardly means that each hinge is folded in the opposite direction to the radius of curvature of the hinge. This is referred to as 'opposite sense' buckling of the tape-spring hinge, in contrast to 'same sense' buckling which would occur if the tape-spring hinge 103 of the present embodiment was folded outwardly. In other embodiments the tape-spring hinges may be folded outwardly when the structure is collapsed into the stowed configuration.

Opposite-sense buckling results in more elastic strain energy being stored in the tape-spring hinge than if same-sense buckling were used. Accordingly, by folding the tape-spring hinges 103 inwardly when the mast structure is collapsed into the stowed configuration, as shown in FIG. 2, a greater amount of energy is stored. This increases the peak force that is exerted on the structure by the tape-spring hinges 103 when the mast structure 100 is in the collapsed configuration, with the result that the structure 100 can be deployed more quickly and/or can move a larger mass than would be the case if the tape-spring hinges 103 were folded outwardly. Another advantage of folding the tape-spring hinges 103 inwardly is that the structure 100 will occupy a smaller volume in the collapsed configuration than if the tape-spring hinges 103 were bent outwardly.

As shown in FIG. 2, the mast structure 100 collapses along its longitudinal axis as the tape-spring hinges 103 within one hinge section 111, 112, 113 are buckled. Since the structure 100 collapses along the longitudinal axis, the resulting volume of the structure in the collapsed configuration is reduced in comparison to prior art structures. The collapsing/deployment mechanism shown in FIG. 2 therefore provides a highly compact deployable mast structure.

In some embodiments, the ring sections 121, 122, 123, 124 may be reinforced by one or more reinforcing members, with the result that the wall stiffness in the ring sections 121, 122, 123, 124 is higher than that in the hinge sections 111, 112, 113. The reinforcing members can help the ring sections to resist twisting and/or buckling as the structure collapses. Reinforcement of the ring sections 121, 122, 123, 124 may be particularly advantageous in embodiments in which the ring sections 121, 122, 123, 124 are relatively short in height compared to the hinge sections 111, 112, 113.

In the present embodiment the wall of the body 101 is formed from a layered composite material, for example an epoxy-carbon fibre composite, and each of the plurality of reinforcing members comprises one or more additional layers of the composite material. As a result, the sections of the wall in which no tape-spring hinges are formed, namely the ring sections 121, 122, 123, 124, have a higher stiffness than the hinge sections 111, 112, 113. In other embodiments a different form of reinforcement may be used, for example metal or ceramic strips or hoops bonded to an inner or outer surface of the ring sections, or embedded within the wall itself. Furthermore, in some embodiments the reinforcing members may be omitted.

As shown in FIGS. 1 and 2, in the present embodiment the plurality of openings 102 are configured such that the tape-spring hinges 103 defined by the openings 102 are narrower at their ends. As a result, when the structure 100 is collapsed, the tape-spring hinges 103 have a tendency to buckle near the point at which they meet the ring sections 121, 122, 123, 124, so that the structure collapses in a uniform and predictable manner. In the present embodiment this is achieved by forming a radius at each corner where a tape-spring hinge 103 meets a ring section 121, 122, 123, 124. The radius reduces the probability of fracture at the joint between the tape spring and the ring section, by avoiding sharp corners which act as stress concentrators. In other embodiments a different shape of opening may be used to achieve a similar result. Further, in other embodiments the tape-spring hinges 103 can be formed so as to have a uniform width along their length. That is, in some embodiments a radius at each corner of the tape-spring hinge may be omitted.

Figure 3:
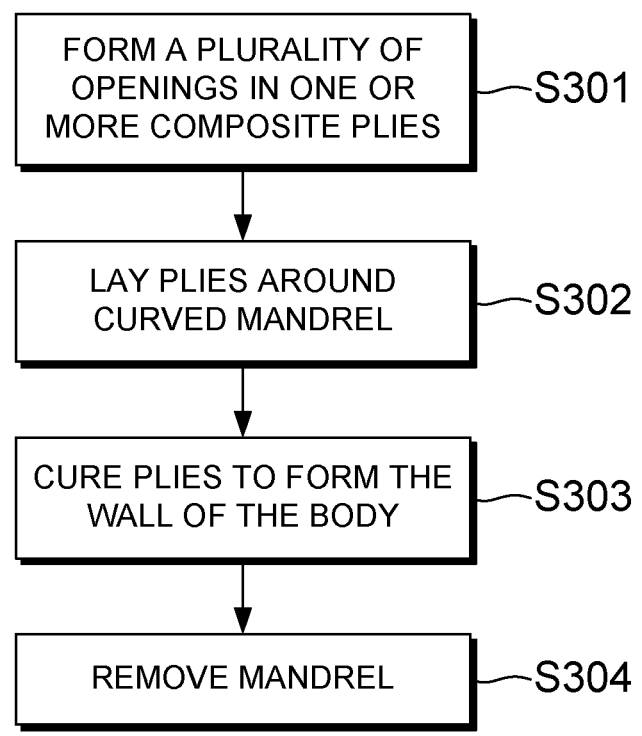
FIG. 3 is a flowchart showing a method of fabricating a deployable mast similar to the one shown in FIG. 1, according to an embodiment of the present invention.

A method of fabricating the deployable mast structure shown in FIGS. 1 and 2 will now be described with reference to FIG. 3. First, in step S301 the plurality of openings are formed in one or more composite plies. The mast structure may be formed from any suitable material. For example, the mast structure can be formed from a composite material comprises a high strength/stiffness fibre and a low stiffness/compliant resin matrix, such as an epoxy-carbon fibre composite.

Next, in step S302 the composite plies are laid around a curved mandrel, which is shaped so as to define the wall of the body, to form a laminate with the correct shape and thickness. The curvature of the surface of the mandrel will define the curvature of the tape-spring hinges. If reinforcement is required for the ring sections, one or more additional plies can be laid around the mandrel at intervals along the longitudinal axis of the body so as to form the reinforcing members in step S302.

Then, in step S303 the composite plies are cured in order to harden the composite material and form the wall of the body. The composite plies may be cured, and post-cured if needed, in a controlled temperature and pressure environment, such as in an autoclave. Finally, in step S304 the completed mast structure is removed from the mandrel. The mast structure is then ready for use, and can be collapsed along its longitudinal axis into the collapsed configuration by buckling the tape-spring hinges.

In some embodiments of the present invention, a control mechanism may be provided to control the speed at which the mast structure deploys from the collapsed configuration once a restraining force is removed. The control mechanism can be configured to control the deployment speed by exerting a braking force which partly counteracts the force exerted by the tape-spring hinges. In some embodiments the control mechanism may comprise an eddy current damper connected to an end of the mast structure by one or more fibres, the eddy current damper being configured to generate a damping force that is proportional to the speed of deployment that results from the force exerted by the tape-spring hinges. In other embodiments a different dampening mechanism may be used.

The dissipative damping moment/force provided by the eddy current damper is directly proportional to the speed of deployment. Therefore, if the tape-spring hinges exert a large deployment force, which would otherwise result in rapid deployment of the structure, the eddy current damper would apply a proportionally high dissipative damping moment/force. Conversely, if the deployment force and therefore the speed of deployment is low, the eddy current damper would apply a proportionally lower moment/force during deployment.

The use of a control mechanism enables the speed of deployment to be tuned, in order to avoid shock and structural damage occurring to the mast structure and any devices attached thereto, by virtue of controlling the release of energy during deployment.

In the above-described embodiments, the mast structure has a uniform diameter along its length. However, in other embodiments the mast structure may be tapered in width along the longitudinal axis. For example, in some embodiments an angle of the taper can be selected to permit a section of the wall at one end of one of the tape-spring hinges to be stored inside a section of the wall at the opposite end of said one of the tape-spring hinges, when the mast structure is in the collapsed configuration. This arrangement can further reduce the volume occupied by the mast structure in the collapsed configuration.

Embodiments of the present invention may find use in various applications, including but not limited to:
- deployment of quad-filar or helicoil antennas;
- deployment of secondary reflector mirrors for deployable antennas;
- deployment of optics for space telescopes;
- deployment of sensitive scientific instrumentation away from the host platform; and
- separation mechanisms for detaching one body from another body.

For example, in one embodiment the deployable mast structure can be included in a deployable antenna assembly comprising a primary reflector, the primary reflector being disposed at one end of the deployable mast structure, and a secondary reflector, the secondary reflector being disposed at an opposite end of the deployable mast structure to the primary reflector. In this way, the size of the antenna assembly can be reduced when the mast structure is in the collapsed configuration.

As a further example, in another embodiment the deployable mast structure can be included in a deployable telescope assembly comprising a sensor disposed at one end of the deployable mast structure, and one or more optical elements disposed along the deployable mast structure. In this way, the size of the deployable telescope assembly can be reduced when the mast structure is in the collapsed configuration.

As a further example, in another embodiment the deployable mast structure can be configured to act as a separation mechanism for detaching a first body (e.g. a spacecraft) from a second body (e.g. a payload). When used as a separation mechanism, the deployable mast structure is configured to urge the first body away from the second body when a restraining force holding the structure in the stowed configuration is released.

Embodiments of the invention have been described in which the body of a deployable mast structure is configured to collapse along its longitudinal axis into the collapsed configuration. This can be achieved by configuring the plurality of openings to provide appropriate dimensions of the tape-spring hinges and the connecting wall sections, such that the structure can collapse along the longitudinal axis without the tape-spring hinges interfering with one another. Since the structure collapses along its longitudinal axis, a compact collapsed configuration is achieved. During deployment, the mast structure extends along its longitudinal axis. This achieves rectilinear motion, in contrast to prior art structures in which rigid sections pivot and fold back on one another. Also, in embodiments of the present invention, the tape-spring hinges lock out to become part of the wall of the mast once the structure is deployed, further increasing the overall rigidity of the deployed structure.

Figure 4:
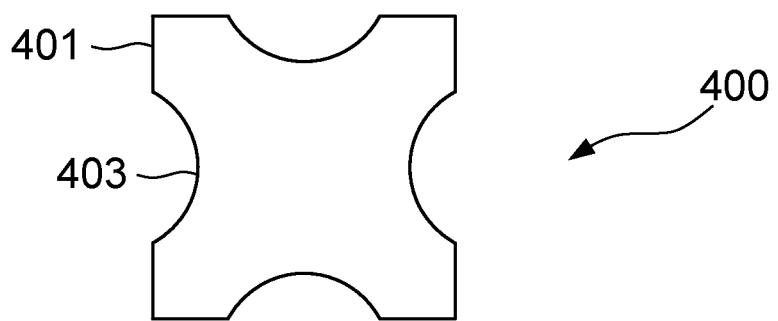
FIG. 4 illustrates a plan view of a deployable mast structure according to an embodiment of the present invention.
Figure 5:
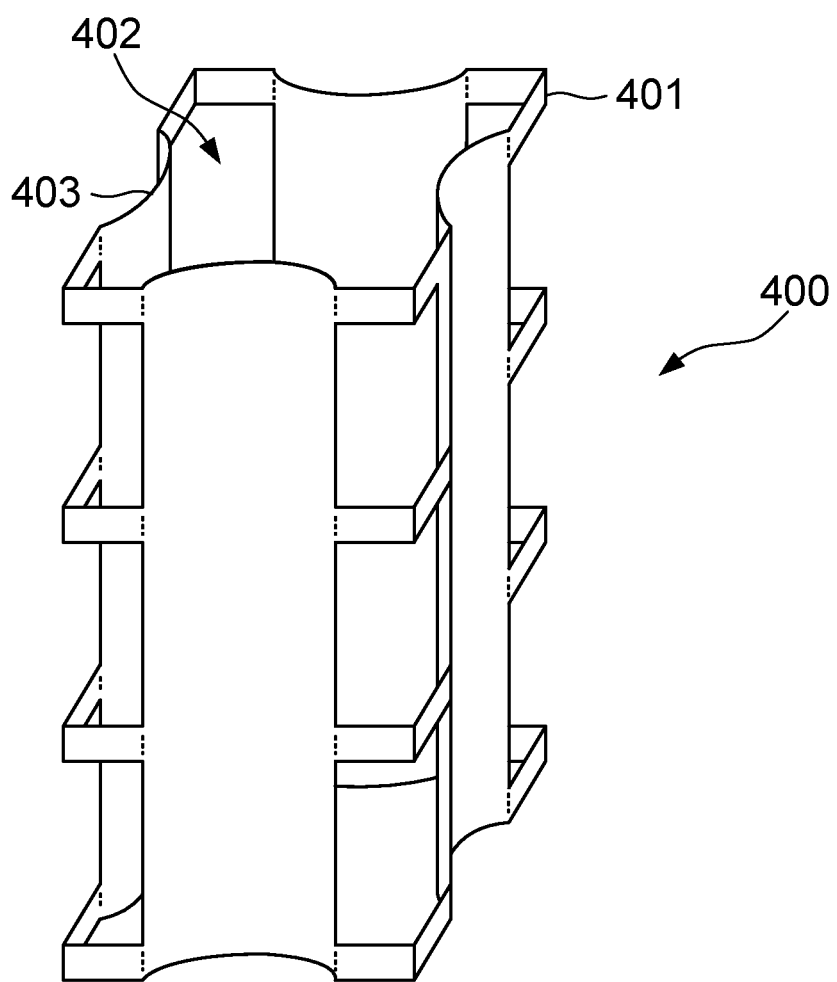
FIG. 5 illustrates a perspective view of the deployable mast structure of FIG. 4.

In embodiments of the present invention, the body in which the openings are formed is configured to adopt a tubular shape in the deployed configuration. The term 'tubular' is used herein to refer to any thin-walled hollow structure with a closed perimeter, and is not limited to structures with circular cross-sections. An example of a tubular structure with a non-circular cross section is illustrated in FIGS. 4 and 5, according to another embodiment of the present invention. In this embodiment, the cross-section is generally square in shape, with a concave segment along each side of the square which forms a tape-spring hinge. In the embodiment shown in FIGS. 4 and 5, when opposite-sense buckling is used the tape-spring hinges are folded outwardly, and when same-sense buckling is used the tape-spring hinges are folded inwardly. Although a square cross-section is illustrated in FIG. 4, in other embodiments the cross-section may be based on any regular or irregular polygon. When a cross-section based on a polygon is used, the cross-section may include one or more straight-edge segments and a plurality of curved-edge segments in which the tape-spring hinges are formed.

Embodiments of the invention have been described in which a tubular structure can be placed into a stowed configuration by collapsing the structure along its longitudinal axis. This folding arrangement enables a significant reduction in the height of the structure in the stowed configuration. Since the connecting ring sections remain substantially undeformed in the stowed configuration, the overall reduction in height of the structure in the stowed configuration depends on the relative height of the tape-spring sections to the ring sections, and on the extent to which each tape-spring section can be collapsed. In some embodiments, the height of each tape-spring section may be greater than or equal to the height of the connecting sections, so that a total reduction in height of roughly 50% or greater can be achieved. Furthermore, in some embodiments the height of each tape-spring section may be substantially greater than that of the connecting ring sections, enabling a substantial reduction in height of the structure.

Furthermore, in some embodiments a system may be provided comprising the deployable mast structure and a hold down and release mechanism (HDRM) configured to apply a restraining force to hold the structure in the stowed configuration, in which the body is collapsed along its longitudinal axis. The system can automatically deploy the mast structure by releasing the restraining force, whereupon the elastic energy stored in the deformed tape-spring hinges in the stowed configuration exerts a force that urges the structure towards the deployed configuration.

Whilst certain embodiments of the invention have been described herein with reference to the drawings, it will be understood that many variations and modifications will be possible without departing from the scope of the invention as defined in the accompanying claims.

The invention claimed is:

1. A deployable mast structure comprising:
- a body configured to adopt a tubular shape when the mast structure is in a deployed configuration; and
- a plurality of openings formed in a wall of the body so as to define a plurality of integral tape-spring hinges in the wall of the body, the plurality of openings being configured so as to permit the body to collapse along its longitudinal axis into a stowed configuration when the tape-spring hinges are buckled,
- wherein in the stowed configuration, the integral tape-spring hinges are configured to exert a force which urges the structure towards the deployed configuration,
- wherein the plurality of openings are arranged into one or more groups spaced apart along the longitudinal axis of the body, such that each group of openings defines a hinge section comprising a plurality of tape-spring hinges arranged around the longitudinal axis, each integral tape-spring hinge including ends connected to sections of the wall in which no tape-spring hinges are formed, and
- wherein the plurality of openings are configured such that the tape-spring hinges defined by the openings are narrower at said ends.

2. The deployable mast structure of claim 1, wherein the plurality of openings are arranged into a plurality of groups spaced apart along the longitudinal axis of the body.

3. The deployable mast structure of claim 2, further comprising:
a plurality of reinforcing members each configured to reinforce one of the sections of the wall in which no tape-spring hinges are formed.

4. The deployable mast structure of claim 3, wherein the wall of the body is formed from a layered composite material and each of the plurality of reinforcing members comprises one or more additional layers of the composite material, such that the sections of the wall in which no tape-spring hinges are formed have a higher stiffness than the hinge sections.

5. The deployable mast structure of claim 2, wherein a length of each of the plurality of openings within a section of the body is selected such that the tape-spring hinges within said section can be folded inwardly towards a centre of the body when the structure is in the stowed configuration.

6. The deployable mast structure of claim 2, wherein the plurality of openings are configured such that the tape-spring hinges defined by the openings are narrower at their ends.

7. The deployable mast structure of claim 1, wherein a length of each of the plurality of openings within a section of the body is selected such that the tape-spring hinges within said section can be folded inwardly towards a centre of the body when the structure is in the stowed configuration.

8. The deployable mast structure of claim 1, wherein the body is tapered in width along the longitudinal axis.

9. The deployable mast structure of claim 8, wherein an angle of the taper is selected to permit a section of the wall at one end of one of the tape-spring hinges to be stored inside a section of the wall at the opposite end of said one of the tape-spring hinges, when the mast structure is in the stowed configuration.

10. The deployable mast structure of claim 1, further comprising:
a control mechanism configured to control a speed at which the mast structure deploys from the stowed configuration once a restraining force is removed, the control mechanism being configured to exert a braking force which partly counteracts the force exerted by the tape-spring hinges.

11. The deployable mast structure of claim 10, wherein the control mechanism comprises:
an eddy current damper connected to an end of the mast structure by at least one fibre, the eddy current damper being configured to generate a damping force that is proportional to the force exerted by the tape-spring hinges.

12. The deployable mast structure of claim 1, wherein the body has a circular cross-section in a plane perpendicular to the longitudinal axis, when in the deployed configuration.

13. The deployable mast structure of claim 1, wherein a cross-section of the tubular structures perpendicular to the longitudinal axis includes one or more straight-edge segments, and further includes a plurality of curved-edge segments in which the tape-spring hinges are formed.

14. A deployable antenna assembly comprising the deployable mast structure of claim 1, the antenna assembly further comprising:
a primary reflector, the primary reflector being disposed at one end of the deployable mast structure; and
a secondary reflector, the secondary reflector being disposed at an opposite end of the deployable mast structure to the primary reflector.

15. A deployable telescope assembly comprising the deployable mast structure of claim 1, the telescope assembly further comprising:
a sensor disposed at one end of the deployable mast structure; and
one or more optical elements disposed along the deployable mast structure.

16. The deployable mast structure of claim 1, wherein the deployable mast structure is configured to urge a first body away from a second body upon the release of a restraining force holding the structure in the stowed configuration, so as to detach the first body from the second body.

17. A system comprising:
the deployable mast structure of claim 1; and
a hold down and release mechanism configured to apply a restraining force to hold the structure in the stowed configuration.

18. A method of fabricating the deployable mast structure of claim 1, the method comprising:
forming the plurality of openings in one or more composite plies;
laying the one or more composite plies around a curved mandrel shaped to define the wall of the body;
curing the one or more composite plies to form the wall of the body; and
removing the mandrel.

19. The method of claim 18, further comprising:
laying one or more additional plies around the mandrel at intervals along the longitudinal axis of the body, so as to form reinforcing members configured to reinforce a section of the wall in which no tape-spring hinges are formed.

* * * * *